United States Patent

Bartlett et al.

[15] 3,654,494

[45] Apr. 4, 1972

[54] CAPACITOR TYPE TIMING CIRCUIT UTILIZING ENERGIZED VOLTAGE COMPARATOR

[72] Inventors: Peter G. Bartlett; Larry K. Clark, both of Davenport, Iowa; Frank W. Hill, Moline, Ill.

[73] Assignee: Gulf & Western Industries, New York, N.Y.

[22] Filed: Aug. 20, 1968

[21] Appl. No.: 812,475

[52] U.S. Cl. ..............................307/293, 307/227, 307/235, 328/129, 328/146, 328/151, 328/186, 330/30 D

[51] Int. Cl. ..............................H03k 17/28

[58] Field of Search ..................307/227, 235, 293; 328/129, 328/146, 150, 151, 186; 330/30 D

[56] References Cited

UNITED STATES PATENTS

| | | | |
|---|---|---|---|
| 3,058,012 | 10/1962 | Harling | 328/186 X |
| 3,184,614 | 5/1965 | Harrison, Jr. | 307/227 X |
| 3,365,586 | 1/1968 | Billings | 307/235 |
| 3,435,193 | 3/1969 | Aitchison | 307/227 X |
| 3,449,741 | 6/1969 | Egerton, Jr. | 328/151 X |

OTHER PUBLICATIONS

Pubi " Analog Output with Fallback and Storage" by Leon & Walton, IBM Tech Disclosure Bulletin, Vol. 9, No. 12, May 1967, p. 1790– 1791.

*Primary Examiner*—Stanley D. Miller, Jr.
*Attorney*—Meyer, Tilberry and Body

[57] ABSTRACT

There is provided a strobed timing circuit which includes a timing capacitor connected across a voltage source for charging at a predetermined rate, and a comparator circuit for providing an output signal when the voltage across the capacitor reaches a set-in value. The comparator circuit is turned on for relatively short intervals of time to measure the voltage across the capacitor to thereby provide a comparator circuit with an apparently high input impedance.

5 Claims, 4 Drawing Figures

INVENTORS.
PETER G. BARTLETT,
LARRY K. CLARK &
BY FRANK W. HILL

*Meyer, Tilberry & Body*

ATTORNEYS

INVENTORS.
PETER G. BARTLETT,
LARRY K. CLARK &
BY FRANK W. HILL

Meyer, Tilberry & Body
ATTORNEYS

CAPACITOR TYPE TIMING CIRCUIT UTILIZING ENERGIZED VOLTAGE COMPARATOR

This invention relates to the art of electronic timers and, more particularly, to timing circuits which include a timing capacitor and comparator circuit.

The invention is particularly applicable for use in strobed timing circuits and will be described with particular reference thereto, although it will be appreciated that the invention has broader application such as in any timing circuit which includes a timing capacitor and a voltage responsive circuit.

Timers known heretofore have included an amplifier circuit connected between a resistor-capacitor timing circuit, and a comparator circuit to isolate, or buffer, the timing capacitor from the input of the comparator circuit. Since the impedance at the input of the comparator circuit was relatively low, on the order of 5,000 ohms, it was necessary to isolate this circuit from the timing capacitor in order to prevent the capacitor from discharging through the comparator circuit. The timed period was varied by adjusting a potentiometer in the comparator circuit, to either increase or decrease the set-in voltage of the circuit.

Since the voltage response of the amplifier was not linear it was extremely difficult to accurately predict the resultant timed period for any given potentiometer adjustment. This problem might be partially overcome by calibrating the potentiometer in a nonlinear manner in accordance with the characteristic voltage response of the amplified circuit. It is, however, quite difficult to calibrate potentiometers in this manner with any reliable degree of accuracy for timing applications. It is also desirable to remove from the circuit the buffer amplifier which inherently introduces additional error in the timing accuracy due to variations in line voltage and changes in values of circuit components.

The present invention contemplates a new and improved timing circuit which overcomes all of the above referred-to problems, and others, and provides an extremely accurate timer.

In accordance with the present invention there is provided a strobed timing circuit having a capacitor for storing a voltage, a normally de-energized comparator circuit for providing an output signal when the capacitor attains a predetermined voltage, and a switching circuit for turning on the comparator circuit for relatively short intervals of time to thereby provide a comparator circuit having an apparently high input impedance.

In accordance with a more limited aspect of the present invention, the capacitor is charged by a pulsating voltage in a stairstep fashion until the voltage across the capacitor reaches a value equal to a predetermined value of the comparator circuit.

The primary object of the present invention is to provide a strobed timing circuit in which the comparator is connected directly to the storage capacitor to thereby provide very accurate timing.

Another object of the present invention is to provide a strobed timer in which the input impedance of the comparator circuit appears to be a very high impedance.

Another object of the present invention is to provide a strobed timing circuit which is temperature compensated for temperature variations in the timing capacitor.

A still further object of the present invention is to provide a capacitor-type timing circuit in which the capacitor charges in a stairstep fashion, and in which the circuit for measuring the voltage attained by the capacitor is connected directly to the capacitor.

A still further object of the present invention is to provide a timer which includes a comparator circuit in which the input impedance of the comparator is made to appear as a high impedance by energizing the comparator circuit for relatively short intervals of time.

In accordance with still a further aspect of the present invention, there is provided a capacitor-type timing circuit which eliminates the buffer amplifier normally connected between the storage capacitor and the voltage responsive measuring circuit.

These and other objects and advantages of the invention will become apparent from the following description of the preferred embodiment of the invention as read in connection with the accompanying drawings in which.

Figure 1:
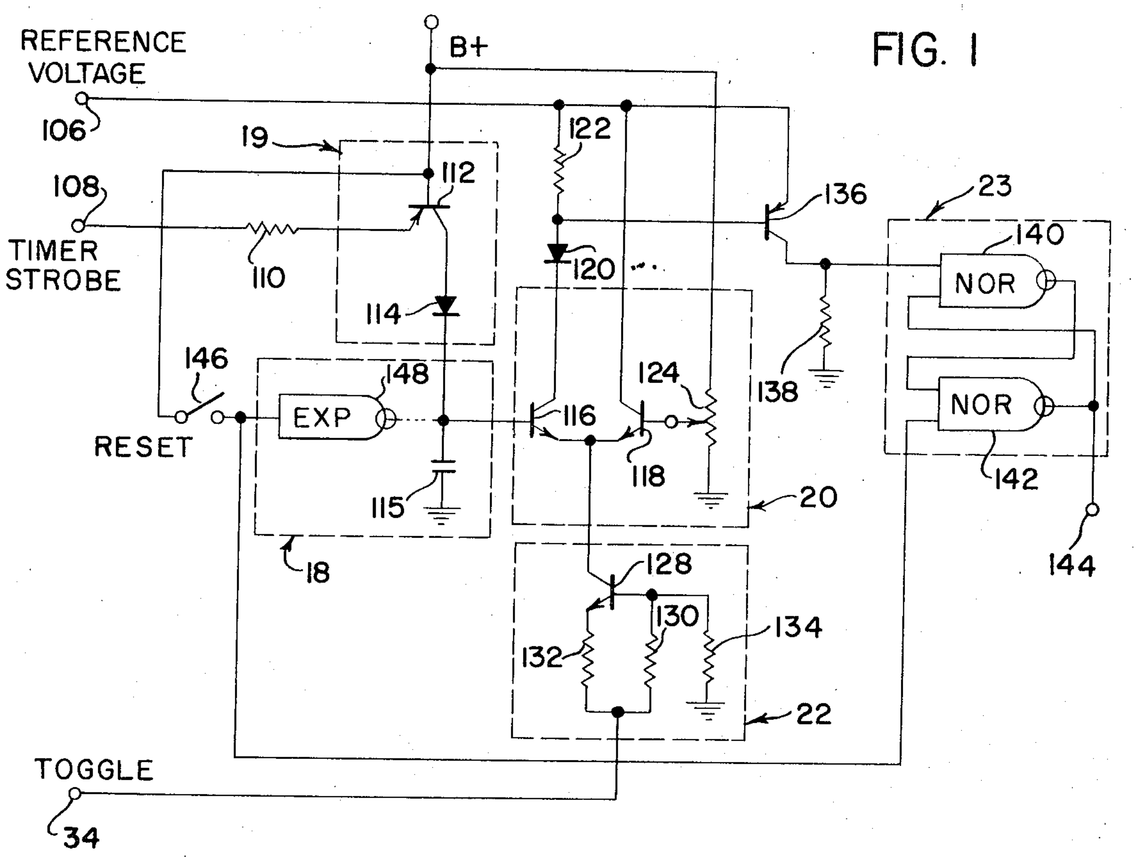
FIG. 1 is a schematic diagram illustrating the preferred embodiment of the timing circuit.
Figure 2:
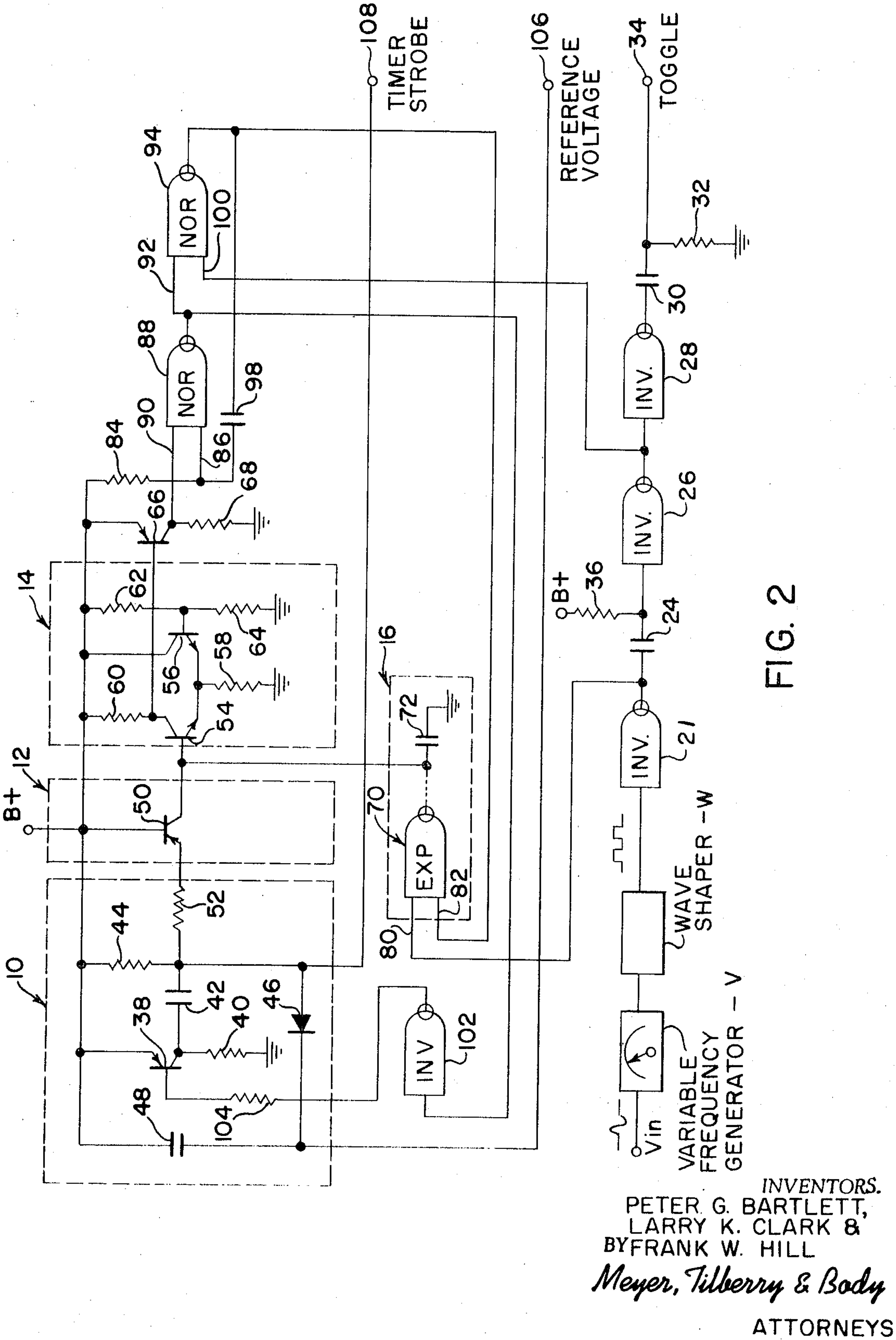
FIG. 2 is a schematic diagram illustrating the preferred embodiment of the strobe circuit to be employed with the timing circuit illustrated in FIG. 1.

Referring now to the drawings wherein the showings are for purposes of illustrating a preferred embodiment of the invention and not for purposes of limiting the same, FIGS. 1 and 2 illustrate a timing circuit and strobe circuit respectively, and generally comprise a voltage doubler 10, constant current circuit 12, comparator 14, storage capacitor and expander circuit 16, storage capacitor and expander circuit 18, constant current source 19, comparator circuit 20, switched current source 22, and bistable multivibrator 23.

STROBE CIRCUIT

As illustrated in FIG. 2, the strobe circuit includes a variable frequency generator V for receiving an input signal Vin, which preferably takes the form of a 60 cycle per second alternating current, line voltage, and for providing an alternating current output signal of a given frequency. The output of the generator V is connected through a wave-shaping circuit W which provides a positive-polarity, square-wave, output signal. The output of the wave-shaping circuit W is connected to one terminal of a capacitor 24 through an inverter 21. The other terminal of capacitor 24 is connected through a pair of series connected inverters 26, 28, to one terminal of a capacitor 30.

Inverters 21, 26, and 28 may take various forms such as a single input NOR gate, similar to the two-input RTL resistor, transistor, logic gate illustrated in FIG. 7.5 at page 178 in the General Electric Transistor Manual, Seventh Edition. Briefly, whenever a positive voltage signal, i.e. a binary "1" signal is applied to the single input, the output carries a ground potential signal, i.e. a binary "0" signal. Conversely, whenever a binary "0" signal is applied to the signal input, the output carries a binary "1" signal.

The other terminal of capacitor 30 is connected through a resistor 32 to ground, and also provides a toggle terminal 34. Connected to the junction between capacitor 24 and inverter 26 is a resistor 36, which, in turn, is connected to a B+ direct-current voltage supply source.

Voltage doubler 10 includes a PNP transistor 38 having its emitter connected to the B+ source supply, and its collector connected through a resistor 40 to ground. Connected in series between the collector and the emitter of transistor 38 is a capacitor 42 and a resistor 44. A diode 46, poled as shown in FIG. 2, is connected between the junction of capacitor 42 and resistor 44, and one terminal of a capacitor 48. The other terminal of capacitor 48 is connected to the B+ source supply.

The constant current source 12 includes a PNP transistor 50 having the base thereof connected to the B+ source supply, and the emitter connected through a resistor 52 to the junction point between capacitor 42 and resistor 44. Comparator 14 includes a pair of NPN transistors 54, 56, having their emitters connected in common and then through a resistor 58 to ground. The base of transistor 54 is connected directly to the collector of transistor 50. The collector of transistor 54 is connected through a resistor 60 to the B+ source supply, and the collector of transistor 56 is connected directly to the B+ source supply. The base of transistor 56 is connected through a resistor 62 to the B+ source supply, and is also connected through a resistor 64 to ground. The collector of transistor 54 is connected to the base of a PNP transistor 66, which has its emitter connected directly to the B+ source supply. The collector of transistor 66 is connected through a resistor 68 to ground.

Capacitor discharge circuit 16 includes an expander circuit 70, having the output thereof connected through a storage capacitor 72 to ground. Expander 70 is of conventional design, such as one stage of the Motorola Input Expander Model MC885P, and is shown in more detail in FIG. 3. Basically, expander 70 is comprised of a pair of NPN transistors 71, 74 which have their collectors connected in common to provide an output for the circuit, and the emitters of these transistors are connected in common to ground. The base terminals of transistors 71, 74 are connected through resistors 76, 78, respectively, to provide the circuit input terminals 80, 82 respectively. The input terminal 80 of expander 70 is connected to the junction between inverter 21 and capacitor 24. The output of expander 70 is connected through capacitor 72 to ground, and is also connected to the collector of transistor 50.

The B+ source supply is connected through a resistor 84 to one input 86 of a RTL NOR gate 88, which may take the form of a single stage of a Motorola Input Gate Model MC824P. The other input 90 of NOR gate 88 is connected directly to the collector of transistor 66. The output of NOR gate 88 is connected to one terminal 92 of a NOR gate 94, which has its output connected to input terminal 82 of expander 70. The output of NOR gate 94 is also connected through a capacitor 98 to the input 86 of NOR gate 88. The other input 100 of NOR gate 94 is connected to the junction between inverter 26 and inverter 28. The output of NOR gate 88 is also connected through an inverter 102 and a resistor 104 to the base of transistor 38.

Thus, the junction point between diode 46 and capacitor 48 provides a reference voltage terminal 106, and the junction point between resistor 44 and diode 46 provides a timer strobe output 108.

TIMER CIRCUIT

Having now described the strobe circuit, reference is now made to FIG. 1 which illustrates the timer circuit which is actuated by the strobe circuit of FIG. 2. The timer strobe terminal 108 is connected through a resistor 110 to the emitter of a PNP transistor 112, having its base connected to the B+ source supply. The collector of transistor 112 is connected through a diode 114, poled as shown in FIG. 1, to one terminal of storage capacitor 115, and the other terminal of capacitor 115 is connected directly to ground.

Comparator 20 is similar to comparator 14, and includes a pair of NPN transistors 116, 118 having their emitters connected in common to switched current source 22. The collector of transistor 116 is connected through a diode 120, poled as shown in FIG. 1, and a resistor 122, to the reference voltage terminal 106. The collector of transistor 118 is connected directly to reference voltage terminal 106, and the base of this transistor is connected to the movable slide of a variable resistor 124 having one terminal connected to the B+ source supply and the other terminal connected to ground.

Switched current source 22 is comprised of a NPN transistor 128 having its collector connected to the common emitters of transistors 116, 118, and having its base connected to its emitter through the series connected resistors 130, 132. The base of transistor 128 is also connected through a resistor 134 to ground. Toggle terminal 34 is connected to the junction between resistor 130 and resistor 132.

The junction between diode 120 and resistor 122 is connected to the base of a PNP transistor 136 having its emitter connected directly to reference voltage terminal 106. The collector of transistor 136 is connected through a resistor 138 to ground, and is also connected to one input of the dual-input, bistable multivibrator 23. Bistable multivibrator 23 includes a pair of RTL NOR gates 140, 142 having an output of each NOR gate connected to one of the input terminals of the other NOR gate. The other input terminal of each of the NOR gates 140, 142 provides an input for the bistable multivibrator 23. The output terminal of NOR gate 142 also provides a timing circuit output terminal 144, which may be employed to control a load such as a traffic signal lamp.

Figure 3:
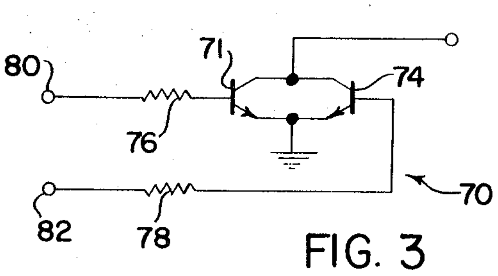
FIG. 3 is a schematic circuit diagram illustrating the expander circuit employed in the timer circuit and the strobe circuit.

A normally-open, reset switch 146 is connected between the B+ source supply and the input terminal of an expander circuit 148. Expander circuit 148 generally takes the form of one section of the expander 70 as shown in FIG. 3, and has its output terminal connected to the junction between diode 114 and storage capacitor 115. Also connected to the input of expander circuit 148 is the other input of NOR gate 142.

Each of the NOR gates 88, 94, 140, 142 may take any suitable form, such as, for example, an RTL NOR gate as shown in FIG. 7.5 on page 178 of the General Electric's Transistor Manual, Seventh Edition, 1964.

OPERATION

The operation of the strobe circuit as illustrated in FIGS. 2 and 3 will be described in three sequences of operation; to wit, reset, timing, and end timing. Reset occurs when the voltage output of wave-shaper W is a binary 0 signal. By a binary 0 signal is meant a signal equal to substantially ground potential, and by a binary 1 signal is meant a signal having a positive value. When a binary 0 signal is applied to the input of inverter 21, the output will take the form of a binary 1 signal, which when applied to input 80 of expander 70 will discharge capacitor 72 through transistor 71.

The truth Table for expander circuit 70 takes the following form. If a binary 1 signal is applied to the base of either transistor, the output takes the form of a binary 0 signal; if a binary 1 signal is applied to both base terminals, the output takes the form of a binary 0 signal. If, however, the input applied to the base terminals of both transistors is a binary 0 signal, the output takes the form of an open circuit to thereby allow capacitor 72 to charge.

During reset, the output of inverter 26 is a binary 0 signal, which is applied to the input 100 of NOR gate 94. Input 86 of NOR gate 88 will be maintained at a binary 1 signal, thereby providing a binary 0 signal on the output of this gate which will be applied to input 92 of NOR gate 94. With a binary 0 signal applied to inputs 92 and 100 of NOR gate 94, the output will take the form of a binary 1 signal, which when applied to input 82 of expander 70 will also provide a discharge path for capacitor 72 through transistor 74. The binary 0 signal at the output of NOR gate 88 will be inverted through inverter 102 to thereby apply a binary 1 signal to the base of transistor 38 to reverse bias this transistor. With transistor 38 in a non-conductive state, capacitor 42 will become charged, thereby providing a voltage equal to approximately the B+ source supply at the timer strobe terminal 108.

The timing operation commences when the output signal of waveshaper W becomes a binary 1 signal, thereby providing a binary 0 signal at the output of inverter 21, which is applied to the input 80 of expander 70. At this time the output of inverter 26 takes the form of a binary 1 signal, which when applied to NOR gate 94 provides a binary 0 output signal. When this binary 0 signal is applied to input terminal 82 of expander 70, capacitor 72 begins to charge through the constant current source 12 thereby commencing the timing period. The binary 0 output signal of NOR gate 94 is applied through capacitor 98 to provide a binary 0 pulse at the input 86 of NOR gate 88. Since input 90 of this gate is also a binary 0 signal, the output takes the form of a binary 1 pulse signal. This binary 1 signal is inverted through inverter 102 to apply a binary 0 signal to the base of transistor 38, thereby momentarily forward biasing this transistor into conduction. When transistor 38 becomes conductive, capacitor 42 will be effectively connected directly to the B+ source voltage and the timer strobe output 108 will attain a voltage pulse equal to approximately twice that of the B+ source supply. The timer strobe output voltage will be applied through diode 46 to thereby charge capacitor 48 to a source supply. The timing operation will continue until capacitor 72 becomes charged to a voltage equal to the reference voltage set into comparator 14. When this voltage is attained, transistor 54 will become conductive and provide a binary 0 signal at the base of transistor 66, which in turn will provide a binary 1 signal at the input 90 of NOR gate 88. Upon receipt of this binary 1 signal at the input of NOR gate 88, the output will take the form of a binary 0 signal, which when inverted through inverter 102 will be applied to the base of transistor 38 as a binary 1 signal. When this binary 1 signal is applied to the base of transistor 38, the transistor will become non-conductive, thereby causing the timer strobe terminal 108 to return to a voltage equal to approximately the B+ source supply; however, the reference voltage terminal 106 will remain at a voltage equal to approximately twice that of the B+ source supply since storage capacitor 48 will tend to remain charged at this value.

When the output signal of wave-shaper W returns to a binary 0 signal, reset will again occur as described above. The positive-polarity, square-wave output of wave-shaper W is inverted through inverters 21, 26 and 28, and capacitors 24 and 30, to provide a series of negative-polarity pulses at toggle terminal 34.

Having now described the operation of the strobe circuit, reference is made to FIG. 1 which illustrates the timer circuit. When the timer strobe output signal reaches a value equal to approximately twice that of the B+ source supply, transistor 112 will become conductive thereby allowing capacitor 115 to begin charging. Since this output signal takes the form of a series of positive polarity pulses, capacitor 115 will charge in a stairstep fashion until the voltage across the capacitor is equal to the set-in voltage of comparator 20. The negative-going pulses at the toggle terminal 34 are applied through switched current source 22 to thereby turn on comparator 20 for relatively short intervals of time. More particularly, when the negative pulse is applied through resistor 132 to the emitter of transistor 128, this transistor becomes conductive, thereby effectively grounding the common emitters of transistors 116, 118. When the emitters of transistors 116, 118, are effectively grounded, comparator 20 becomes energized and becomes responsive to the voltage developed across capacitor 115. Since comparator 20 is energized for relatively short periods of time, i.e. on the order of $1/10^6$ seconds, the input of comparator 20 appears to be a very high impedance, thereby placing a very small load across capacitor 115. When the voltage across capacitor 115 reaches the set-in value of comparator 20, and comparator 20 is energized, transistor 116 will become conductive thereby applying a binary 0 signal to the base of transistor 136. Upon receipt of this binary 0 signal, transistor 136 will become conductive thereby providing a binary 1 signal at the input of bistable multivibrator 23. When this binary 1 signal is applied to multivibrator 23, the output 144 takes the form of a binary 1 signal, which in turn may be employed to energize a load.

In order to reset the timer circuit, switch 146 is momentarily closed, thereby discharging capacitor 115 through expander 148, and also resetting bistable multivibrator 23. Expander 148 operates in a manner similar to expander 70, however, this expander is preferably comprised of only a single transistor having a single input.

It may be seen that temperature compensation is accomplished by utilizing capacitors 115 and 72 having the same temperature coefficient. If capacitor 72 decreases in value as a result of a change in temperature, the time required to attain the voltage necessary to trigger the comparator circuit would be shortened, thereby causing the pulse at the timer strobe terminal 108 to be accordingly shortened. Capacitor 115, having the same temperature coefficient as capacitor 72 will require a correspondingly shorter time to reach the voltage required to trigger comparator 20; therefore, resulting in a temperature compensated timing circuit.

Figure 4:
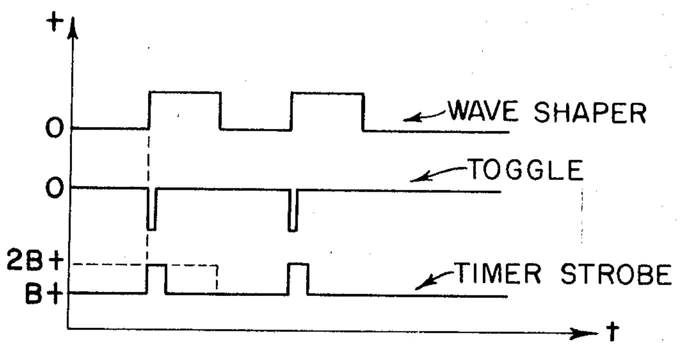
FIG. 4 is a diagram illustrating the various voltage output waveforms of the strobe circuit of FIG. 2.

As shown by the waveforms illustrated in FIG. 4, the signal applied to the toggle terminal 34 takes the form of a negative polarity pulse of a very short time duration, i.e. on the order of $1/10^6$ seconds. The signal applied to the timer strobe terminal 108 takes the form of a series of positive polarity pulses having a minimum amplitude equal to approximately B+, and a maximum amplitude equal to approximately twice the B+ source supply. The duration of the positive-going pulse is equal to the time required for capacitor 72 to charge to the set-in voltage of comparator 14.

The time required to complete a timing cycle may preferably be altered by one of two different methods. Either the variable resistor 124 may be varied to change the set-in voltage of comparator 20, or alternatively, the frequency of the variable frequency generator V may be varied to change the charging rate of capacitor 115, thereby changing the time required to charge capacitor 115 to the set-in value of comparator 20.

Although the invention has been described in connection with a preferred embodiment, it will be readily apparent to those skilled in the art that various changes in form and arrangement of parts may be made to suit requirements without departing from the spirit and scope of the invention as defined by the appended claims.

Having thus described our invention, we claim:

1. A strobed timing circuit including:

a first timing capacitor for storing a voltage;

means for connecting said capacitor to a source of voltage for charging said capacitor;

a normally de-energized comparator means having an input coupled to said capacitor and having a first and second state; said comparator means, when energized, being responsive to the voltage stored by said capacitor so that when the value of said stored voltage attains a level equal to a predetermined value said comparator means changes from said first state to said second state;

a first circuit means for periodically developing a signal pulse;

a first switch means for energizing said comparator means at a frequency dependent on the frequency of said periodically developed signal pulse whereby when said comparator means is energized it exhibits a relatively low input impedance and when deenergized it exhibits a relatively high input impedance;

a second circuit means for developing a pulsating voltage from a source supply; and a first electronic control device for coupling said second circuit means to said capacitor for charging said capacitor in a stairstep fashion in response to said pulsating voltage;

said electronic control device having a first, second, and control electrode, said first electrode being coupled to said source supply, said second electrode being coupled to said capacitor, and said control electrode being coupled to said second circuit means;

said timing capacitor including a first and a second terminal; said first terminal of said capacitor being coupled to said second electrode of said first electronic control device and to said comparator; and said switch means including a second electronic control device having a first and a second state, and a first, second, and control electrode; said first electrode of said second control device being coupled to said comparator means; said second electrode of said second control device being coupled to said second terminal of said capacitor, and said control electrode of said second device being coupled to said first circuit means so that upon receipt of a signal from said circuit means said electronic control device changes from said first state to said second state to thereby connect said comparator across said terminals of said timing capacitor.

2. A strobed timing circuit including:

a first timing capacitor for storing a voltage;

means for connecting said capacitor to a source of voltage for charging said capacitor;

a normally de-energized comparator means having an input coupled to said capacitor and having a first and second state; said comparator means, when energized, being responsive to the voltage stored by said capacitor so that when the value of said stored voltage attains a level equal to a predetermined value said comparator means changes from said first state to said second state;

a first circuit means for periodically developing a signal pulse;

a first switch means for energizing said comparator means at a frequency dependent on the frequency of said periodically developed signal pulse;

a second circuit means for developing a pulsating voltage from a source supply;

means for coupling said circuit means to said capacitor for charging said capacitor in a stair-step fashion in response to said pulsating voltage, said second circuit means including a second timing capacitor for storing a voltage; means for connecting said second capacitor to said source supply for charging said capacitor at a predetermined rate and thereby commencing a timing cycle of operation; and a second comparator means coupled to said second capacitor and having a first and a second condition; said second comparator means being responsive to the voltage stored by said second capacitor so that when the voltage stored by said second capacitor attains a level equal to a second predetermined value said second comparator means changes from said first condition to said second condition to thereby develop said pulsating voltage, whereby when said comparator means is energized it exhibits a relatively low input impedance and when de-energized it exhibits a relatively high input impedance.

3. A strobed timing circuit as defined in claim 2, wherein said first timing capacitor and said second timing capacitor have approximately the same temperature coefficient.

4. A strobed timing circuit including:

a first timing capacitor for storing a voltage;

means for connecting said capacitor to a source of voltage for charging said capacitor;

a normally de-energized comparator means having an input coupled to said capacitor and having a first and second state; said comparator means, when energized, being responsive to the voltage stored by said capacitor so that when the value of said stored voltage attains a level equal to a predetermined value said comparator means changes from said first state to said second state;

a first circuit means for periodically developing a signal pulse;

a first switch means for energizing said comparator means at a frequency dependent on the frequency of said periodically developed signal pulse whereby when said comparator means is energized it exhibits a relatively low input impedance and when de-energized it exhibits a relatively high input impedance;

a second circuit means for developing a pulsating voltage from a source supply;

means for coupling said second circuit means to said capacitor for charging said capacitor in a stairstep fashion in response to said pulsating voltage;

said second circuit means including a second timing capacitor for storing a voltage;

means for connecting said second capacitor to said source supply for charging said capacitor at a predetermined rate and thereby commencing the timing cycle of operation; and a second comparator means coupled to said second capacitor and having a first and a second condition; said second comparator being responsive to the voltage stored by said second capacitor so that when the voltage stored by said second capacitor attains a level equal to a second predetermined value said second comparator means changes from said first state to said second condition to thereby develop said pulsating voltage;

said first timing capacitor and said second timing capacitor having approximately the same temperature coefficient;

said first circuit means being coupled to an alternating voltage source of a given frequency; said first circuit means being responsive to said voltage source whereby said signal pulse has a frequency dependent on said given frequency so that the time at which said first comparator circuit is energized is a function of said given frequency.

5. A strobed timing circuit as defined in claim 4 wherein said second circuit means is coupled to said alternating voltage source of a given frequency; said second circuit means is responsive to said voltage source whereby said pulsating voltage has a frequency dependent on said given frequency so that the time required to charge said first capacitor is a function of said frequency.

* * * * *